United States Patent [19]
Bean et al.

[11] Patent Number: 5,176,042
[45] Date of Patent: Jan. 5, 1993

[54] HAND BRAKE ACTUATOR

[75] Inventors: Andrew J. Bean, Cincinnati; Ronald J. Schneider, Cleves, both of Ohio

[73] Assignee: Huffy Corporation, Miamisburg, Ohio

[21] Appl. No.: 833,192

[22] Filed: Feb. 10, 1992

[51] Int. Cl.⁵ .......... F16C 1/10; G05G 11/00
[52] U.S. Cl. .......... 74/502.2; 74/489; 188/24.11; 188/24.12
[58] Field of Search .......... 74/502.2, 489, 551.1, 74/551.7, 551.8, 557, 558; 188/24.11, 24.12

[56] References Cited

U.S. PATENT DOCUMENTS

| 3,977,270 | 8/1976 | Cristie | 74/489 |
|---|---|---|---|
| 4,304,146 | 12/1981 | Ueda | 74/489 |
| 4,307,625 | 12/1981 | Lauzier | 74/502.2 |
| 4,532,825 | 8/1985 | Nagano | 74/502.2 |
| 4,543,847 | 10/1985 | Nagano | 74/489 X |
| 4,611,500 | 9/1986 | Nagano | 74/489 |
| 4,637,273 | 1/1987 | Nagano | 74/489 |
| 4,704,044 | 11/1987 | Yoshigai | 74/502.2 |
| 4,735,106 | 4/1988 | Yoshigai | 188/24.12 X |
| 4,785,683 | 11/1988 | Buckley et al. | 74/489 |
| 4,909,094 | 3/1990 | Yashigai | 74/489 |
| 4,914,971 | 4/1990 | Hinkens et al. | 74/489 |
| 4,916,967 | 4/1990 | Nakamura | 74/502.2 |
| 4,921,081 | 5/1990 | Chilcote | 188/24.11 X |
| 4,977,792 | 12/1990 | Nagano | 74/502.2 |
| 5,050,444 | 9/1991 | Nishimura | 74/489 X |

FOREIGN PATENT DOCUMENTS

| 0014782 | 1/1991 | Japan | 74/502.2 |
|---|---|---|---|
| 857055 | 12/1960 | United Kingdom | 74/489 |

Primary Examiner—Vinh T. Luong
Attorney, Agent, or Firm—Biebel & French

[57] ABSTRACT

A hand brake actuator for actuating a caliper brake on a bicycle. The actuator is attached to the handlebar by a mounting bracket. A lever pivotally attached to the mounting bracket actuates the caliper of the bicycle brake. A shroud integrally formed with the lever receives the mounting bracket during pivotal movement of the lever.

20 Claims, 5 Drawing Sheets

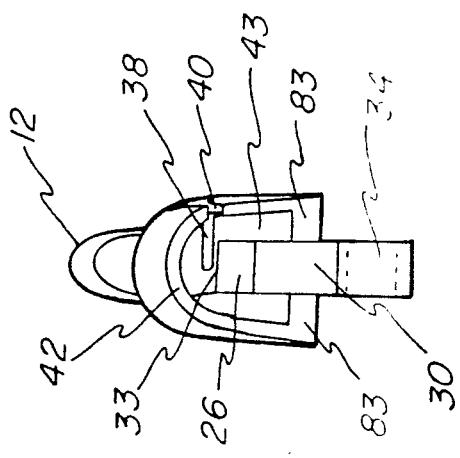
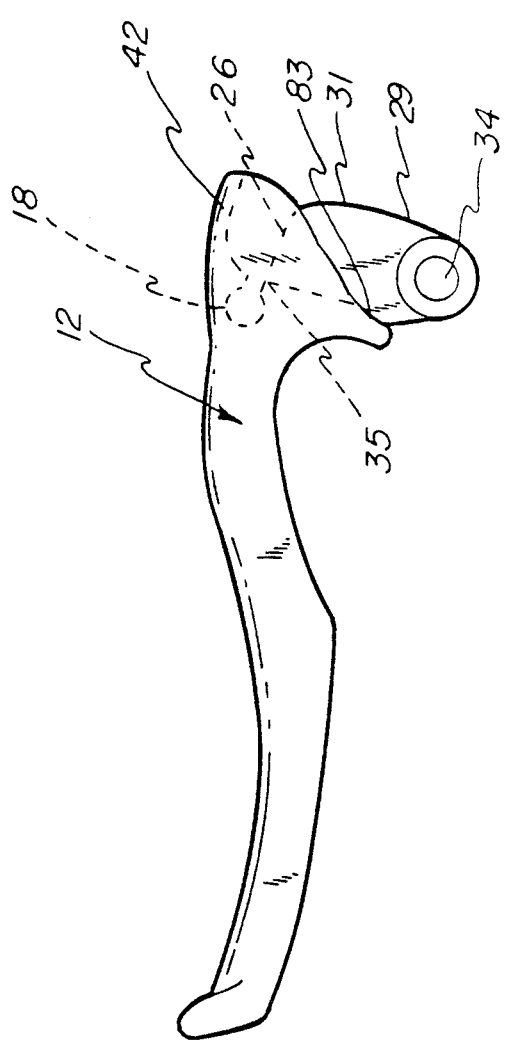

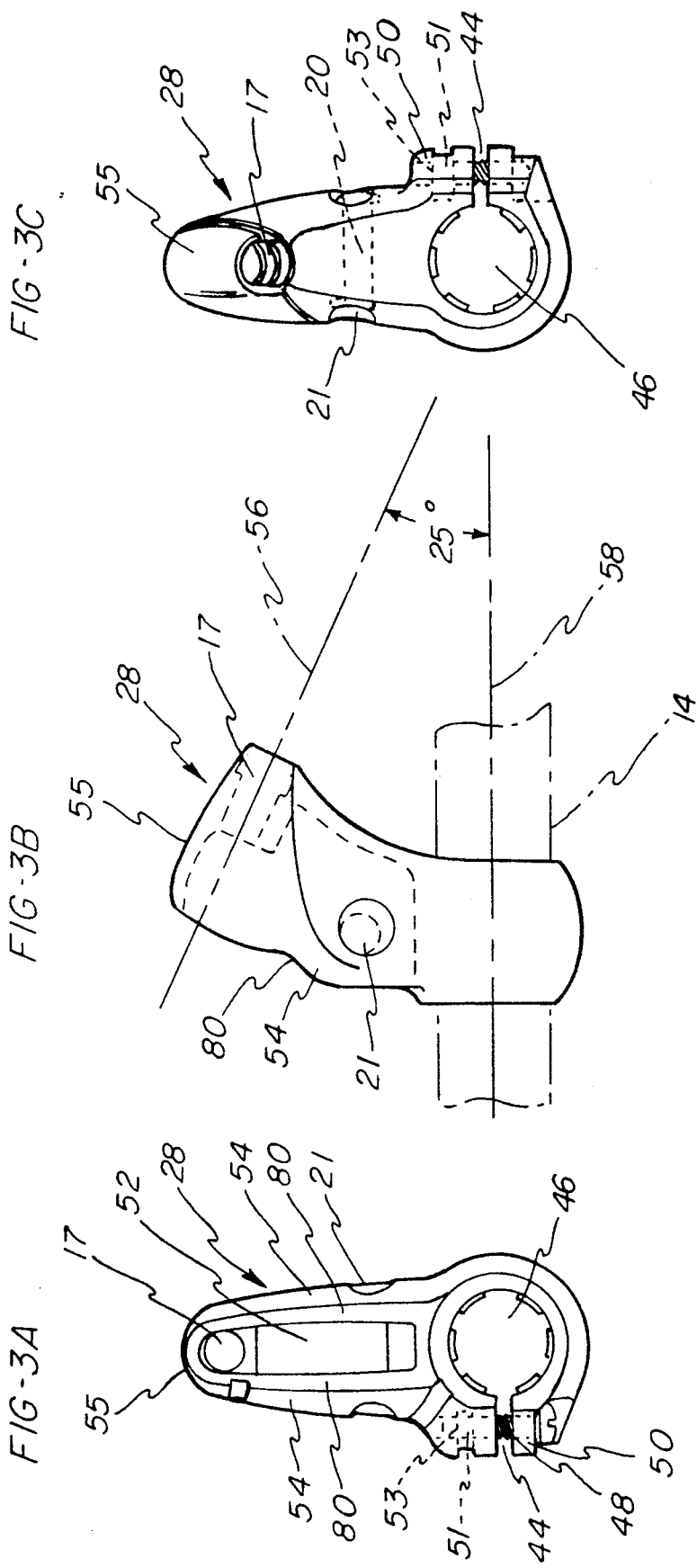

HAND BRAKE ACTUATOR

FIELD OF THE INVENTION

This invention relates to a hand brake actuator used for actuating a caliper brake on a bicycle, and more specifically, to a hand brake actuator including a bracket and lever attached in a pivotal relationship to each other wherein the bracket is mounted to the handlebars of a bicycle and pivotal movement of the lever results in actuation of the brake on the bicycle.

BACKGROUND OF THE INVENTION

In the past there have been several designs for bicycle hand brake actuators. These designs generally include a bracket which is mounted in stationary relationship to the handlebars and which carries a pivot pin located adjacent to the handlebars and an aperture distal from the handlebars for receiving and mounting the end of a bowden cable sheath extending from the brake on the bicycle. A lever used on these designs typically has a portion for engagement with the hand of an operator, which portion extends substantially parallel to the handle bar of the bicycle and a second portion which extends perpendicular to the hand engagement portion and includes an aperture for receiving the pivot pin.

Examples of these prior hand brakes are disclosed in U.S. Pat. No. 4,611,500 granted to Nagano, and U.S. Pat. No. 4,404,146 granted to Ueda. Both of these Patents show typical prior art brake operating mechanisms in which a pivoted lever has a cable end attached to it such that as the lever is pivoted, the portion of the lever holding the end of the cable draws the cable end away from the aperture for receiving the cable in the mounting bracket whereby the cable is moved relative to an outer sheath.

The operation of the Nagano and Ueda devices results in the formation of a gap between the bracket and the lever, in which the gap is exposed and may form a pinch point or area where foreign materials will easily enter the braking mechanism. This gap creates a hazard in which articles or an individual's fingers or hands can get caught in the gap and pinched when the lever is released.

Another prior art hand brake is discloses in U.S Pat. No. 4,785,683 granted to Buckley. Buckley shows a hand brake actuator in which the gap between the mounting point on the lever for attaching the cable and the aperture in the stationary bracket for holding the cable sheath is cover by a shroud.

Although the shroud disclosed in the Buckley patent covers the gap area formed by conventional brake actuators, a new gap is formed at the point where the lever passes out of the shroud, which gap could also form a pinch point.

Accordingly, there is a need for a brake lever which prevents the formation of exposed gaps between the pivoted lever and the mounting bracket throughout the movement of the lever.

SUMMARY OF THE INVENTION

The present invention provides a hand brake actuator mounted to a handlebar of a bicycle which is utilized to actuate a brake caliper on the bicycle. The hand brake actuator has a mounting bracket mounted to the handlebar. The mounting bracket includes side walls and a top wall which define a recess. An aperture for accommodating a brake cable is located adjacent the top wall.

The actuator further has an elongated lever having a first and second end with a tongue member extending from the first end of the lever. The tongue passes in between the opposing side walls of the mounting bracket and is pivotally mounted to the mounting bracket to provide pivotal movement of the lever.

A shroud is provided which extends from the first end of the lever, surrounding a portion of the mounting bracket and the tongue. The shroud defines a U-shaped recess adjacent to the junction of the tongue member with the lever. The opposing side walls and the top wall of the mounting bracket are received within the U-shaped recess during the pivotal movement of the lever.

The tongue is mounted with a pivot bushing to the mounting bracket thereby allowing pivotal movement of the lever to actuate the brake caliper.

Thus, it is an object of the present invention to provide a hand brake actuator which prevents the formation of gaps where items may be pinched during pivoting of the lever on the hand brake actuator.

Another object is to provide a hand brake actuator which allows smooth actuation of the brake caliper on a bicycle.

Other objects and advantages of the present invention will be apparent from the following description, the accompanying drawings and the appended claims.

BRIEF DESCRIPTION OF THE DRAWINGS

FIG. 2A is a side view of the lever of the hand brake actuator.

FIG. 2B is a front view of the lever of the hand brake actuator.

FIG. 3A is a rear view of the mounting bracket for the hand brake actuator.

FIG. 3B is a side view of the mounting bracket for the hand brake actuator.

FIG. 3C is a front view of the mounting bracket for the hand brake actuator.

DETAILED DESCRIPTION OF THE PREFERRED EMBODIMENT

Figure 1:
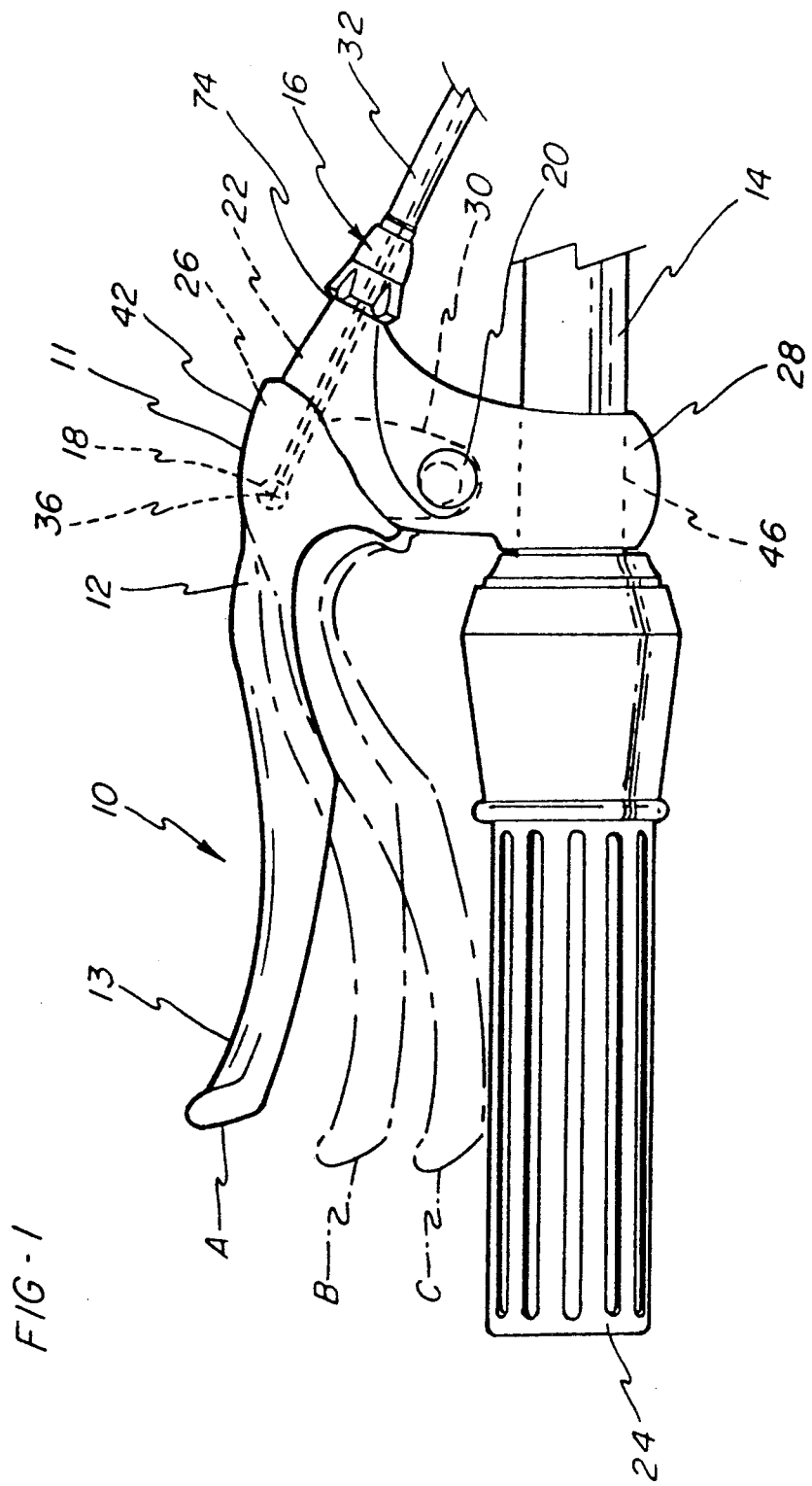
FIG. 1 is a side view of the hand brake actuator attached to a handlebar of a bicycle.

Referring to the drawings, the hand brake actuator device 10 of the present invention is shown in FIG. 1 attached to the handlebar 14 of a bicycle. The hand brake actuator 10 has various pivoting positions, three of which are illustrated by positions A, B, and C in FIG. 1. A mounting bracket 28 of the actuator includes an aperture 46 for receiving the handlebar 14 of the bicycle.

A hand lever 12 having a first end 11 and a second end 13 is pivotally mounted to the mounting bracket 28 to actuate the brake caliper. A tongue member 30, shown in phantom, extends from a junction 33 with the lever 12 at the first end 11 of the lever 12. The tongue member 30 is pivotally attached to the mounting bracket 28 by a bushing 20.

A hand grip 24 is provided on the bicycle handlebar 14 which can be a standard rubberized grip or preferably a grip shift for shifting the gears of the bicycle. One aspect of the present invention is that the clearance between the hand lever 12 in position A and the grip 24 of the bicycle is the minimum distance required by the Consumer Protection and Safety Commission and yet provides enough room to operate the grip shift 24.

Now referring to FIG. 2A, the hand lever 12 has a pivot aperture 34 in tongue member 30 for receiving the bushing 20 for pivotally mounting the lever 12 to the mounting bracket. The tongue member 30 has a front surface 31 extending from a point 29 adjacent the pivot aperture 34 and a top surface 26 extending from the front surface 31 towards the junction 33 between the tongue member 30 and the lever 12. The top surface 26 is oriented substantially perpendicular to the front surface 31.

A movable wire portion 22 of a brake cable 32 is supported by the top surface 26 when the wire 22 is positioned in the lever 12 with a crown portion 36 of the wire 22 in an aperture 18 formed behind the junction 33. The crown 36 has generally a cylindrical shape and is attached to the end of the wire 22 to provide an enlarged gripping element for engagement within the aperture 18, such that movement of the lever 12 results in movement of the crown end of the wire 22 to actuate a brake caliper attached to the other end of the wire 22.

The aperture 18 is shown in phantom in FIG. 2A since the aperture 18 is accessible from the right side of the lever 12, as viewed in FIG. 2B. A shroud 42 is formed integrally with the first end 11 of the lever 12 and encompasses a rear portion of tongue member 30. The shroud 42 and tongue member 30 define a U-shaped recess 43 adjacent to the junction 33, as is best seen in FIG. 2B.

The shroud 42 further encompasses the mounting bracket 28 such that when the hand lever is actuated a gap is not formed between the exterior surfaces of the hand lever 12 and the mounting bracket 28, thereby preventing any articles from entering between the moving parts of the actuator 10 and being pinched by the pivoting of the lever 12. This is a substantial benefit over the prior hand brake actuators in which a gap is formed between the lever and mounting bracket such that foreign objects may enter and become caught in the formed gap.

Referring to FIG. 2B, the lever 12 is shown in a front view and includes a slit 38 located behind the junction 33 for receiving the wire 22 of the brake cable 32. A slit 40 is formed contiguous with the slit 38 in the shroud 42. The slit 40 extends substantially parallel to the top surface 26 and is provided for permitting the brake cable 22 to pass through the shroud 42 to the upper surface 26 of the tongue member 30. The slits 38 and 40 permit easy installation of the brake cable 22 into the interior hand brake actuator.

Now referring to FIG. 3A, the rear side of the mounting bracket 28 is shown with the lever 12 removed and includes a slot 44 to allow the clamping aperture 46 to expand and contract for mounting on the handlebar of a bicycle. A bolt 48 is placed through a bolt aperture 50 and a nut 51 is located in a nut slot 53 in order to clamp mounting bracket 28 to the handlebar 14. Once the mounting bracket 28 is mounted on the handlebar, the bolt 48 is tightened to maintain the position of the mounting bracket 28.

An elongated recess portion 52, defined by opposing side walls 54 and a top wall 55 is provided in the mounting bracket 28. The elongated recess 52 receives a front portion of the tongue member 30 intermediate the opposing side walls 54 such that the tongue member 30 is free to pivot about the pivot bushing 20 as described above.

Referring further to FIGS. 3B and 3C, the mounting bracket 28 is provided with a cable aperture 17 which is used to mount the cable assembly 32 and permit passage of the wire portion 22 rearwardly into engagement with the lever 12. The cable aperture 17 is located adjacent to the top wall 55 and is adapted to receive a bushing 16 for mounting the end of the sheath for the cable 32.

It should be noted that a center axis 56 of the cable aperture 17 is preferably angled relative to a central axis 58 of the clamping aperture 46. This angling of the aperture 17 permits the brake cable to be held in close proximity to the handlebar 14 and further facilitates the positioning of the cable wire 22 within the actuator assembly 10 such that during actuation of the lever 12 the portion of the wire 22 extending rearwardly from the aperture 17 remains substantially aligned with the axis 56. In the preferred embodiment, the angle defined between the axes 56 and 58 is approximately 25°.

Referring to FIG. 3B, an abutment surface 80 is defined by rearwardy facing edges of each of the side walls 54 of the bracket 28. As may be seen in FIGS. 2A and 2B, the lever 12 is also provided with abutment surfaces 83 located below the U-shaped recess 43 at the first end 11 of the lever 12. The abutment surfaces 80,83 contact each other when the lever is in position A, as seen in FIG. 1, whereby the upward pivotal movement of the lever 12 relative to the bracket 28 is limited.

Further, it should be noted that as the lever 12 is moved from position A in FIG. 1 to position C, the forward edge of the shroud 42 will extend forwardly of the rearward edges of the bracket side walls 54 and top wall 55. Thus the shroud 42 will continuously overlap the upper rear portion of the bracket 28 throughout movement between positions A and C and during positioning of the lever 12 at any intermediate position B. It should also be noted that the present invention is preferably designed such that overlapping relationship between the shroud 42 and the bracket 28 continues at least until a lower surface of the second end 13 of the lever 12 facing the handlebar 14 is adjacent to a line 57 (see FIG. 6) extending parallel to the axis 58 and located a distance from the axis 58 an amount equal to the radius of the aperture 46 in a direction toward the lever 12.

Figure 6:
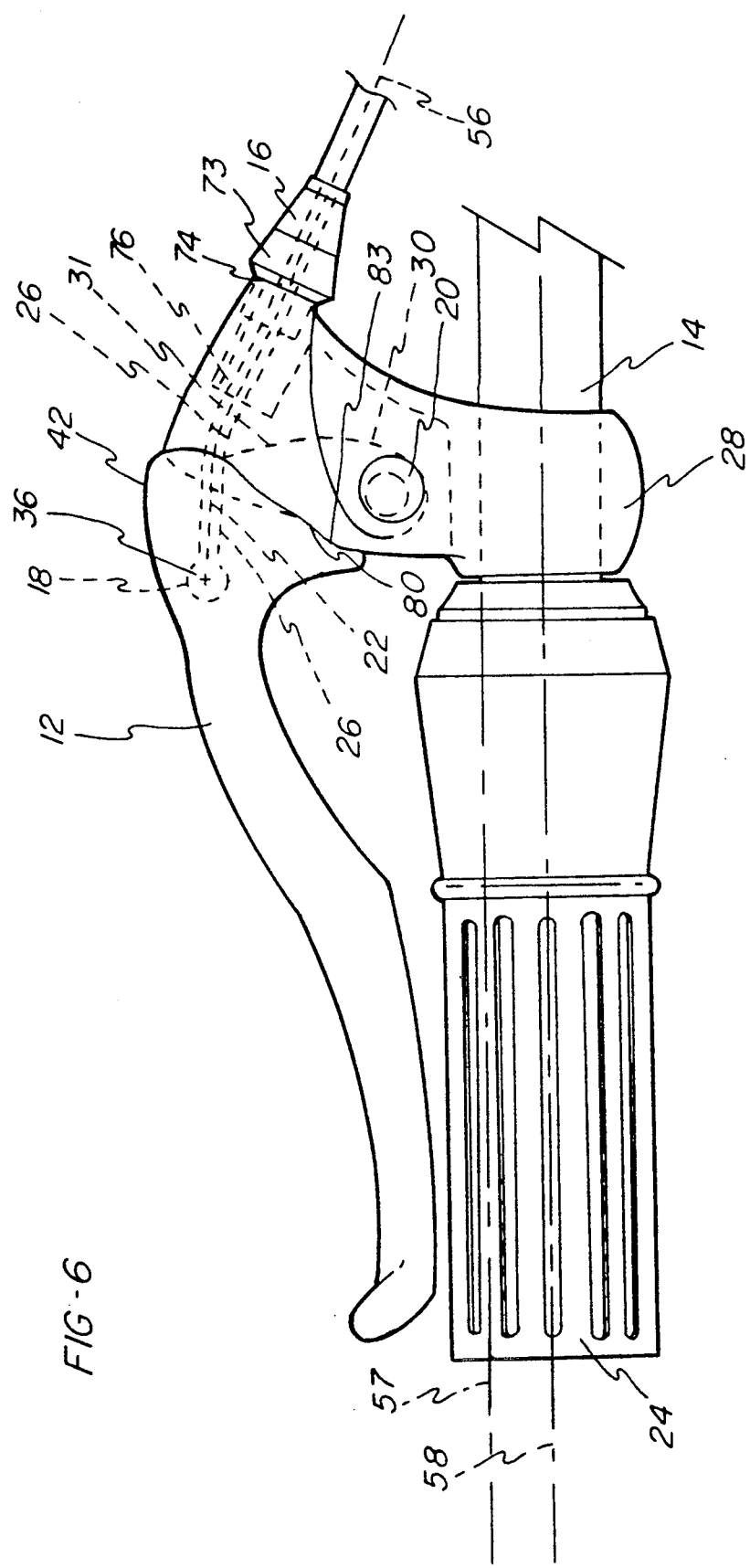
FIG. 6 is a side view of the hand brake actuator in the fully extended position.

FIG. 6 illustrates the lever 12 in a fully actuated position corresponding to the position C shown in FIG. 1. In this figure, it should be noted that the wire 22 extends along a line substantially parallel to the axis 56 as it passes from the bushing 16 to the junction between the top surface 26 and front surface 31 of the tongue member 30. Thus, the upper surface 26 of the tongue member 30 acts to guide the wire 22 in a substantially straight line out of the bushing 16 such that abrasive wear and binding of the wire against the bushing 16 is avoided, which problems could occur if the wire 22 were to pass out of the bushing 16 at an angle during pivotal movement of the lever 12.

Figure 4A:
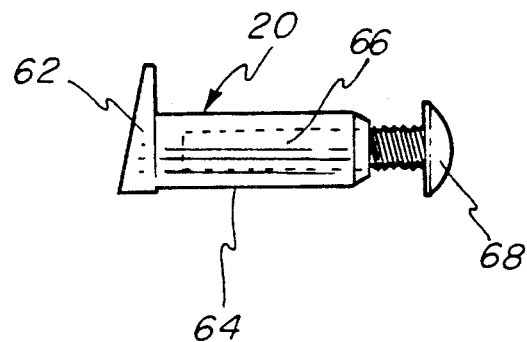
FIG. 4A is a side view of the bushing for attaching the lever to the mounting bracket of the hand brake actuator.
Figure 4B:
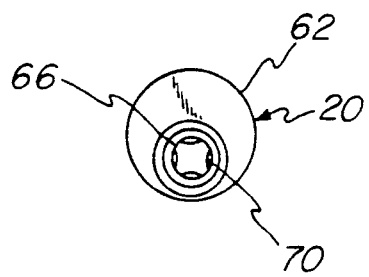
FIG. 4B is a front view looking down through the bushing of FIG. 4A.

Referring to FIGS. 4A and 4B, the pivot bushing 20 includes a stud portion 64 and an enlarged head 62 attached eccentrically to one end of the stud 64. One of the walls 54 of the bracket 28 is provided with an enlarged recess for receiving the head 62 and, by virtue of its eccentricity, the head 62 prevents rotation of the stud 64 when the stud 64 is positioned through apertures in opposing walls 54 and through the tongue 30 such that a screw or bolt 68 may be easily tightened within the stud 64 without causing rotation of the bushing 20. In order to accommodate the screw or bolt 68, the stud 64 is formed with an aperture 66 therethrough and elongated ribs 70 having threads formed therein are provided, as may be seen in FIG. 4B.

Figure 5:
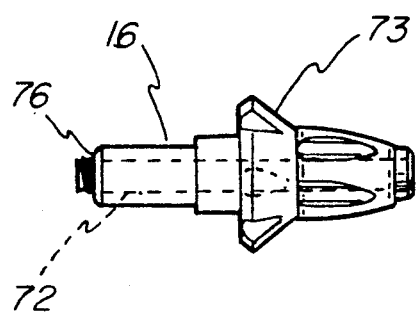
FIG. 5 is a side view of the bushing for the brake cable in the mounting bracket.

Now referring to FIG. 5, the brake cable bushing 16 has an elongated hole 72 to accommodate the brake cable 32 and the brake cable wire 22.

Referring further to FIGS. 1 and 6, the bushing 16 is placed inside the brake cable aperture 17 in which a head portion 73 of the bushing 16 is adjacent an opening 74 of the brake cable aperture 17. The brake cable 32 is placed inside the bushing 16 with the wire 22 extending through the bushing 16 and out through an opening 76 at a rear portion of the bushing 16.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A hand brake actuator for actuating a caliper brake on a bicycle, said actuator comprising:
    a mounting bracket including means defining an aperture for receiving a handlebar of the bicycle therethrough;
    means defining an elongated recess in said bracket, said recess being formed by opposing side walls and a top wall connecting said side walls;
    means defining an aperture in said bracket adjacent to said top wall for receiving a cable therethrough;
    an elongated lever having first and second ends;
    a tongue member extending from a junction with said lever at said first lever end and passing in between said opposing side walls of said bracket;
    pivot means extending through said opposing walls and said tongue member whereby said lever is mounted to said bracket for pivotal movement;
    a shroud extending from said first lever end and surrounding a portion of said tongue member, said shroud and tongue member defining a U-shaped recess adjacent to said junction of said tongue member with said lever; and
    wherein said opposing side walls and top wall of said bracket are received within said U-shaped recess during pivotal movement of said lever.

2. The actuator of claim 1 wherein said shroud is formed integrally with said lever.

3. The actuator of claim 1, wherein said opposing side walls define a first abutment surface on said bracket and a second abutment surface is defined on said lever adjacent to said U-shaped recess, said first and second abutment surface contacting each other during pivotal movement of said lever.

4. The actuator of claim 1 wherein said tongue member includes a front surface extending from a point adjacent to said pivot means and a top surface extending from said front surface towards said junction of said tongue member and said lever, said top surface extending substantially perpendicular to said front surface.

5. The actuator of claim 4 wherein said aperture in said bracket for receiving a cable defines a line which substantially intersects the point of intersection between said front and top surfaces of said tongue member.

6. The actuator of claim 4, including a slit in said shroud for receiving a cable, said slit extending substantially parallel to said top surface to a point on said lever past said junction of said tongue member and said lever.

7. The actuator of claim 6 wherein said lever defines an aperture for receiving a crown on an end of said cable.

8. The actuator of claim 4 wherein said top surface of said tongue guides said cable substantially linearly throughout said pivotal movement of said lever with respect to said line defined by said aperture of said bracket.

9. The actuator of claim 1 including a pivot bushing extending through said opposing walls and said tongue member for facilitating said pivotal movement of said lever.

10. The actuator of claim 9 wherein said pivot bushing includes an elongated stud and a head mounted eccentrically to said stud whereby rotation of said pivot bushing is prevented.

11. The actuator of claim 10 including a fasting means fastened to said pivot bushing for maintaining said pivot bushing in said opposing walls and said tongue member.

12. A hand brake actuator for actuating a caliper brake on a bicycle, said actuator comprising:
    a mounting bracket including means defining an aperture for receiving a handlebar of the bicycle therethrough;
    a longitudinal center axis extending through said aperture of said mounting bracket;
    means defining an elongated recess in said bracket, said recess being formed by opposing side walls and a top wall connecting said side walls;
    means defining an aperture in said bracket adjacent to said top wall for receiving a cable therethrough;
    an inner longitudinal axis defined by said aperture for receiving said cable extending through said center of said aperture for receiving said cable and intersecting said center longitudinal axis of said mounting bracket for receiving said handlebars;
    an elongated lever having first and second ends;
    a tongue member extending from a junction with said lever at said first lever end and passing in between said opposing side walls of said bracket;
    said opposing walls and said tongue member defining a pivot aperture;
    a pivot bushing extending through said pivot aperture of said opposing walls and said tongue member whereby said lever is pivotally mounted to said bracket for pivotal movement;
    a shroud integrally formed from said first lever end extending from said first lever end and surrounding a portion of said tongue member, said shroud and tongue member defining a U-shaped recess adjacent to said junction of said tongue member with said lever;
    wherein said opposing side walls and top wall of said bracket are received within said U-shaped recess during pivotal movement of said lever; and
    said shroud defining a slit for receiving said cable extending substantially parallel to said top surface to a point on said lever past said junction of said tongue and said lever.

13. The actuator of claim 12, wherein said opposing side walls define a first abutment surface on said bracket and a second abutment surface is defined on said lever adjacent to said U-shaped recess, said first and second abutment surface contacting each other during pivotal movement of said lever.

14. The actuator of claim 12 wherein said tongue member includes a front surface extending from a point adjacent to said pivot means and a top surface extending from said front surface towards said junction of said tongue member and said lever, said top surface extending substantially perpendicular to said front surface.

15. The actuator of claim 14 wherein said aperture in said bracket for receiving a cable defines a line which substantially intersects the point of intersection between said front and top surfaces of said tongue member.

16. The actuator of claim 15 including a crown on said cable, said lever defining an aperture for receiving said crown through said slit of said shroud, whereby said lever actuates said brake during said pivotal movement of said lever.

17. The actuator of claim 14 wherein said top surface of said tongue guides said cable substantially linearly throughout said pivotal movement of said lever with respect to said line defined by said aperture of said bracket.

18. The actuator of claim 12 wherein said pivot bushing includes an elongated stud and a head mounted eccentrically to said stud whereby rotation of said pivot bushing is prevented.

19. The actuator of claim 18 including a fastening means fastened to said pivot bushing for maintaining said pivot busing in said opposing walls and said tongue member.

20. The actuator of claim 12 wherein said intersecting of said longitudinal axis of said aperture for receiving said cable and said center longitudinal axis of said mounting bracket is at an angle of approximately 25 degrees.

* * * * *